US009507489B2

(12) United States Patent
Negoro

(10) Patent No.: US 9,507,489 B2
(45) **Date of Patent: *Nov. 29, 2016**

(54) REMOTE EDITING OF A USER INTERFACE WITH VALIDITY CONFIRMATION

(71) Applicant: RICOH COMPANY, LTD., Tokyo (JP)

(72) Inventor: Shigeo Negoro, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/668,540

(22) Filed: Mar. 25, 2015

(65) Prior Publication Data

US 2015/0199079 A1 Jul. 16, 2015

Related U.S. Application Data

(63) Continuation of application No. 13/414,265, filed on Mar. 7, 2012, now Pat. No. 9,015,598.

(30) Foreign Application Priority Data

Mar. 11, 2011 (JP) ................................ 2011-054212

(51) Int. Cl.
*G06F 3/0481* (2013.01)
*H04N 1/00* (2006.01)
(Continued)

(52) U.S. Cl.
CPC ......... *G06F 3/0481* (2013.01); *G06F 17/2247* (2013.01); *H04L 67/02* (2013.01); *H04N 1/00222* (2013.01); *H04N 1/00244* (2013.01); *H04N 1/00464* (2013.01);
(Continued)

(58) Field of Classification Search
CPC .................................................. H04N 1/00506
See application file for complete search history.

(56) References Cited

U.S. PATENT DOCUMENTS 8,230,328 B2 7/2012 Yamamura et al.
2004/0012628 A1 1/2004 Kropf et al.
(Continued)

FOREIGN PATENT DOCUMENTS

JP 2005-228106 A 8/2005
JP 2009-54027 3/2009
(Continued)

OTHER PUBLICATIONS

Office Action issued Nov. 18, 2014 in Japanese Patent Application No. 2011-054212.

*Primary Examiner* — Asher Kells
(74) *Attorney, Agent, or Firm* — Oblon, McClelland, Maier & Neustadt, L.L.P.

(57) ABSTRACT

An edition control system includes a screen manager managing UI part information indicating a UI part displayable on a UI screen; a user information manager managing screen configuration information of the UI screen for each of users; an edition controller, when receiving a display request, generating screen information of the UI screen based on the UI part information and the screen configuration information corresponding to the user of the display request; a Web application controller generating Web screen information of a Web screen; and a Web browser displaying the Web screen based on the Web screen information. Further, upon acquiring the edition information from the Web application controller, the edition controller sets the screen configuration information of the UI screen based on the edition information in the user information manager.

6 Claims, 18 Drawing Sheets

(51) Int. Cl.
*H04L 29/08* (2006.01)
*G06F 17/22* (2006.01)
*G06F 3/12* (2006.01)

(52) U.S. Cl.
CPC ......... *H04N 1/00506* (2013.01); *G06F 3/122* (2013.01); *G06F 3/1229* (2013.01); *G06F 3/1271* (2013.01); *G06F 3/1285* (2013.01); *H04N 2201/0094* (2013.01)

(56) References Cited

U.S. PATENT DOCUMENTS

| | | | |
|---|---|---|---|
| 2005/0039125 | A1 | 2/2005 | Katano |
| 2005/0039126 | A1 | 2/2005 | Katano |
| 2007/0091010 | A1 | 4/2007 | Richardson et al. |
| 2008/0250494 | A1 | 10/2008 | Nagata |
| 2009/0055764 | A1* | 2/2009 | Katsumata ............ G06F 9/4443 715/764 |
| 2009/0064002 | A1 | 3/2009 | Katsumata et al. |
| 2010/0180206 | A1 | 7/2010 | Silva et al. |
| 2011/0145722 | A1 | 6/2011 | Kim |

FOREIGN PATENT DOCUMENTS

| | | | |
|---|---|---|---|
| JP | 2009-130493 | | 6/2009 |
| JP | 4355815 | | 8/2009 |
| JP | 2009-301336 | A | 12/2009 |
| JP | 2010-39841 | A | 2/2010 |

* cited by examiner

FIG.4A

```
<!DOCTYPE html PUBLIC "-//W3C//DTD HTML 4.01 Transitional//EN"
"http://www.w3.org/TR/html4/loose.dtd">
<html>
<head>
<meta http-equiv="Content-Type" content="text/html; charset=windows-31j">
<script type="text/javascript" src="js/jquery/jquery-1.4.2.min.js"></script>
<!-- jquary (javascript LIBRARY) IS USED. THE POSITION OF SOURCE IS
DESIGNATED AND ACQUIRED BY BROWSER -->
<script type="text/javascript" src="js/jquery/jquery-ui-1.8.4.custom.min.js"></script>
<style TYPE="text/css">
tr {
        text-align: center;
        height: 60px;
}
td {
        width: 120px;
}
</style>
<title>Drag and Drop</title>
</head>
<body>
<h3>DRAG AND DROP SAMPLE</h3>
<!-- DISPLAY TABLE (HTML PART) -->
<table id="area" border=1 cellspacing=0 cellpadding=2>
<tr>
<td><img src="images/copy.jpg" class='icon'></td>
<td></td>
<td><img src="images/documentbox.jpg" class='icon'></td>
<td></td>
<td></td>
</tr>
<tr>
<td></td>
<td><img src="images/e-mail.jpg" class='icon'></td>
<td></td>
<td></td>
<td></td>
</tr>
<tr>
<td></td>
<td></td>
<td></td>
<td></td>
<td></td>
</tr>
</table>

⋮
```

```
<script type="text/javascript">
        /* SET OBJECT HAVING class NAME "icon" DRAGGABLE */
        $('.icon').draggable({
                /* DRAGGABLE RANGE IS WITHIN id AREA NAME "area" ONLY */
                containment: '#area'
        });
        /* SET td TAG IN TAG WITHIN id AREA NAME "area" DRAGGABLE */
        $('#area td').droppable({
                /* SET OBJECT HAVING class NAME "icon" DROPPABLE HERE */
                accept: '.icon',
                /* PROCESS WHEN DROPPED */
                drop: function(e, ui) {
                        /* CELL OF DROPPED DESTINATION */
                        var targetCell = $(e.target);
                        /* DROPPED ICON */
                        var selectedIcon = $('.ui-draggable-dragging');
                        /* ICON ORIGINALLY EXISTED IN DROPPED
DESTINATION (ONE OR ZERO THOUGH BEING LISTED) */
                        var prevIconList = targetCell.children();
                        /* MOVE ICON ORIGINALLY EXISTED IN
DROPPED DESTINATION TO CELL WHERE DROPPED ICON ORIGINALLY EXISTED */
                        if(prevIconList.length > 0) {

        prevIconList.appendTo(selectedIcon.parent());
                        }
                        /* MOVE DROPPED ICON TO CELL OF
DROPPED DESTINATION AMD RESET POSITION IN CELL */
                        selectedIcon.appendTo(targetCell)
                                .css('top', '0')
                                .css('left', '0');
                }
        });
</script>
</body>
</html>
```

ADDITION OF ICON

SELECT ICON TO BE ADDED

| | IMAGE ▼ | ITEM | FUNCTION KEY | REGISTRATION DATE | APPLICATION NAME | ATTRIBUTE |
|---|---|---|---|---|---|---|
| ○ | | COPY | F2 | 2010/06/01 | COPY | BASIC APPLICATION |
| ○ | | PRINTER | | 2010/06/01 | PRINTER | BASIC APPLICATION |
| ○ | | EASY DOCUMENT PRINT | | 2010/06/01 | PRINTER | APPLICATION 2 |
| ○ | | EASY DOCUMENT PRINT | | 2010/06/01 | PRINTER | APPLICATION 4 |
| ○ | | EASY SCAN | | 2010/06/01 | SCANNER | APPLICATION 3 |
| ○ | | RESOURCE SAVING COPY | | 2010/06/01 | COPY | PROGRAM 5 |
| ○ | | DOUBLE SIDED PRINTING | | 2010/06/01 | COPY | PROGRAM 13 |
| ○ | | DOUBLE SIDED AGGREGATION | | 2010/06/01 | COPY | PROGRAM 16 |
| ○ | | EASY DOCUMENT PRINT | | 2010/06/01 | PRINTER | APPLICATION 12 |
| ○ | | DOUBLE SIDED AGGREGATION | | 2010/06/01 | COPY | PROGRAM 25 |
| ○ | | EASY DOCUMENT PRINT | | 2010/06/01 | PRINTER | APPLICATION 2 |
| ○ | | EASY DOCUMENT PRINT | | 2010/06/01 | PRINTER | APPLICATION 8 |
| ○ | | EASY DOCUMENT PRINT | | 2010/06/01 | PRINTER | APPLICATION 9 |
| ○ | | EASY DOCUMENT PRINT | | 2010/06/01 | PRINTER | APPLICATION 10 |
| ○ | | EASY SCAN | | 2010/06/01 | SCANNER | APPLICATION 3 |
| ○ | | RESOURCE SAVING COPY | | 2010/06/01 | COPY | PROGRAM 5 |
| ○ | | DOUBLE SIDED PRINTING | | 2010/06/01 | COPY | PROGRAM 13 |
| ○ | | DOUBLE SIDED AGGREGATION | | 2010/06/01 | COPY | PROGRAM 26 |

OK | CANCEL

| SCREEN POSITION | PART ID | PART NAME | PART TYPE |
|---|---|---|---|
| 1 | A1 | COPY | APPLICATION (COPY) |
| 2 | A3 | SCANNER | APPLICATION (SCANNER) |
| 3 | A4 | PRINTER | APPLICATION (PRINTER) |
| 4 | A5 | FAX | APPLICATION (FAX) |
| 5 | A2 | DOCUMENT BOX | APPLICATION (DB) |
| 6 | P13 | ECO COPY MONOCHROME | PROGRAM (COPY) |
| 7 | | | |
| 8 | S23 | TEMPLATE FOR CONFERENCE DOCUMENT | SDK |

FIG.9

| PART ID | PART NAME | PART TYPE |
|---|---|---|
| A1 | COPY | APPLICATION (COPY) |
| A2 | DOCUMENT BOX | APPLICATION (DB) |
| A3 | SCANNER | APPLICATION (SCANNER) |
| P1 | REGULAR DOCUMENT PRINTING | PROGRAM (PRINTER) |
| P2 | REGULAR DOCUMENT DISTRIBUTION | PROGRAM (SCANNER) |
| P3 | DOUBLE SIDED AGGREGATE PRINTING | PROGRAM (COPY) |
| P4 | ECO PRINTING | PROGRAM (PRINTER) |
| P5 | ECO BINDING | APPLICATION (DB) |

FIG.10

| SCREEN POSITION | PART ID |
|---|---|
| 1 | A1 |
| 2 | S23 |
| 3 | A4 |
| 4 | A5 |
| 5 | A2 |
| 6 | P13 |
| 7 | P5 |
| 8 | A3 |

FIG.14

| APPLICATION NAME | A | B | C | ··· | N |
|---|---|---|---|---|---|
| COPY | OK | NG | OK | ··· | NG |
| FAX | OK | OK | OK | ··· | NG |
| ⋮ | ⋮ | ⋮ | ⋮ | ⋮ | ⋮ |
| SCANNER | NG | OK | OK | ·· | NG |

REMOTE EDITING OF A USER INTERFACE WITH VALIDITY CONFIRMATION

CROSS-REFERENCE TO RELATED APPLICATIONS

This application is a continuation of U.S. application Ser. No. 13/414,265, filed Mar. 7, 2012, which claims priority under 35 U.S.C. §119 to Japanese Patent Application No. 2011-054212 filed Mar. 11, 2011, the entire contents of each of which are hereby incorporated herein by reference.

BACKGROUND OF THE INVENTION

1. Field of the Invention

The present invention relates to an edition control system, an image processing apparatus, and a recording medium for editing a UI (User Interface) screen.

2. Description of the Related Art

Recently, in a UI screen of a Multi Function Peripheral (MFP), it has become possible to dynamically change the items to be customized and the user corresponding to the customization based on user's operational environment.

Further, there is a technique in which the customization of the UI screen may be executed not from an operational panel of the apparatus to be controlled but from a personal computer (PC) where customization application software is installed.

For example, Japanese Patent Application No. 2007-98376 discloses a technique in which a panel display part of an image forming apparatus is customized for each user, and a user logs in an application on a PC, so that the user may edit the panel display on the PC. This technique, however, may require the installation of dedicated software in the PC.

Further, recently, based on a Web service function, there has been a technique in which a remote user may edit an operational screen of an image forming apparatus. For example, Japanese Laid-open Patent Publication No. 2009-130493 discloses an image forming apparatus having a Web server function, where a remote user may adequately add, edit, and update the contents of the Web service operational screen or the operational screen of the image forming apparatus.

However, in this case, whenever the editing and the like is executed, a request process and a response process may have to be executed between the PC and the image forming apparatus. Therefore, due to the processes, the communication traffic may be increased in the communication path (line).

SUMMARY OF THE INVENTION

The present invention is made in light of the above circumstances, and may provide an edition control system, an image processing apparatus, an edition control program, and a recording medium enabling editing the UI screen from the PC.

According to an aspect of the present invention, there is provided an edition control system including an image processing apparatus and an information processing apparatus which are connected to each other via a network. The edition control system includes a screen manager managing UI (User Interface) part information indicating a UI part displayable on a UI screen; a user information manager managing screen configuration information of the UI screen for each user; an edition controller generating screen information of the UI screen based on the UI part information managed by the screen manager and the screen configuration information that is managed by the user information manager and that corresponds to a user relevant to the display request, the UI screen being requested to be displayed when receiving a display request to display the UI screen from the information processing apparatus; a Web application controller converting the generated screen information into an HTML format, and generating Web screen information of a Web screen where the UI screen is edited and that includes the screen information in the HTML format and a script for screen operations; a communicator transmitting the generated Web screen information to the information processing apparatus; and a Web browser displaying the Web screen based on the Web screen information, and transmitting edition information indicating the UI screen where editing has been confirmed using the script to the Web application controller. Further, upon acquiring the edition information from the Web application controller, the edition controller sets the screen configuration information of the UI screen based on the edition information in the user information manager.

BRIEF DESCRIPTION OF THE DRAWINGS

Other objects, features, and advantages of the present invention will become more apparent from the following description when read in conjunction with the accompanying drawings, in which:

FIG. 4A illustrates an example of Web screen information;

FIG. 4B illustrates an example of the Web screen information;

FIG. 7 is an example of a UI part list screen;

FIG. 8 is an example of screen configuration information of the home screen;

FIG. 9 is an example of UI part information;

FIG. 10 is an example of customization information;

FIG. 14 is an example of authority information;

DETAILED DESCRIPTION OF THE PREFERRED EMBODIMENTS

In the following, an embodiment of the present invention is described with reference to the accompanying drawings.

A Multi-Function Peripheral (MFP) is used as an example of an image processing apparatus to describe the embodiment.

Embodiment

System

Figure 1:
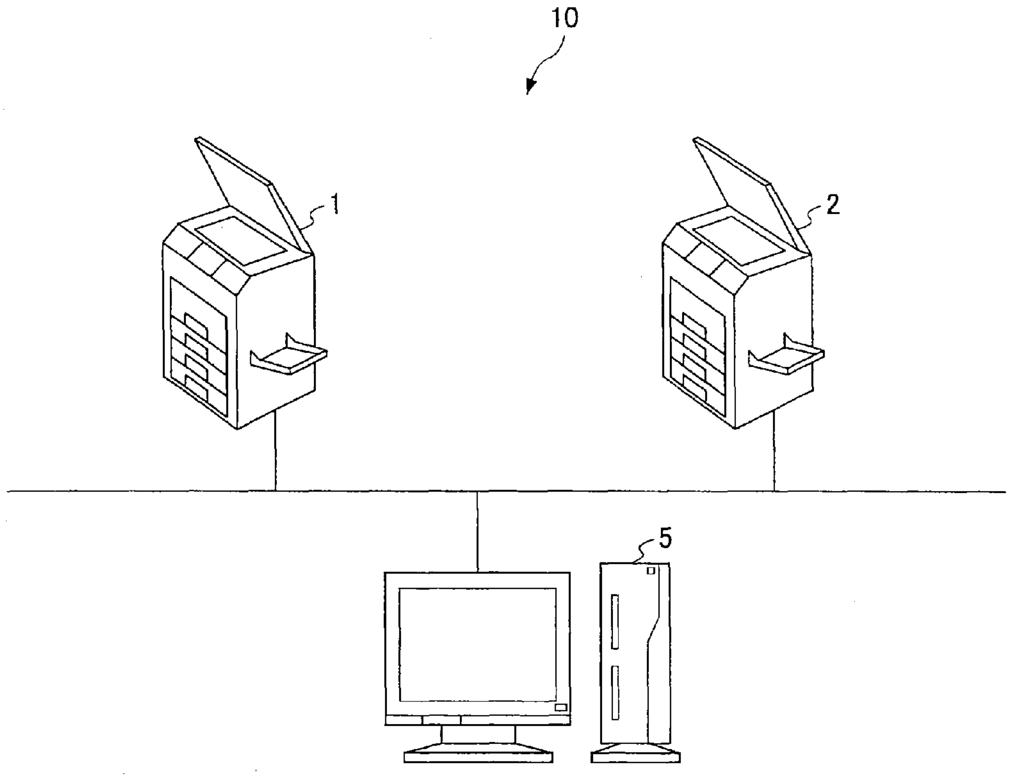
FIG. 1 illustrates an example of a customization control system according to an embodiment of the present invention.

FIG. 1 illustrates an example of a customization (editing) control system 10 according to this embodiment. As illustrated in FIG. 1, the customization control system 10 is connected to MFPs 1 and 2, and an information processing apparatus (hereinafter may be referred to as a "client PC") 5. However, in the present invention, the number of the devices connected in the customization control system 10 is not limited to the number of the devices in FIG. 1.

In the customization control system 10 of FIG. 1, for example, a home screen of the MFP 1 is (remotely) customized (edited) on the client PC 5 side (by the client PC 5). In this case, the client PC 5 side performs the customization process until the customization is confirmed, and when the customization is confirmed, the MFP 1 acquires the confirmed customization information.

Hardware

Figure 2:
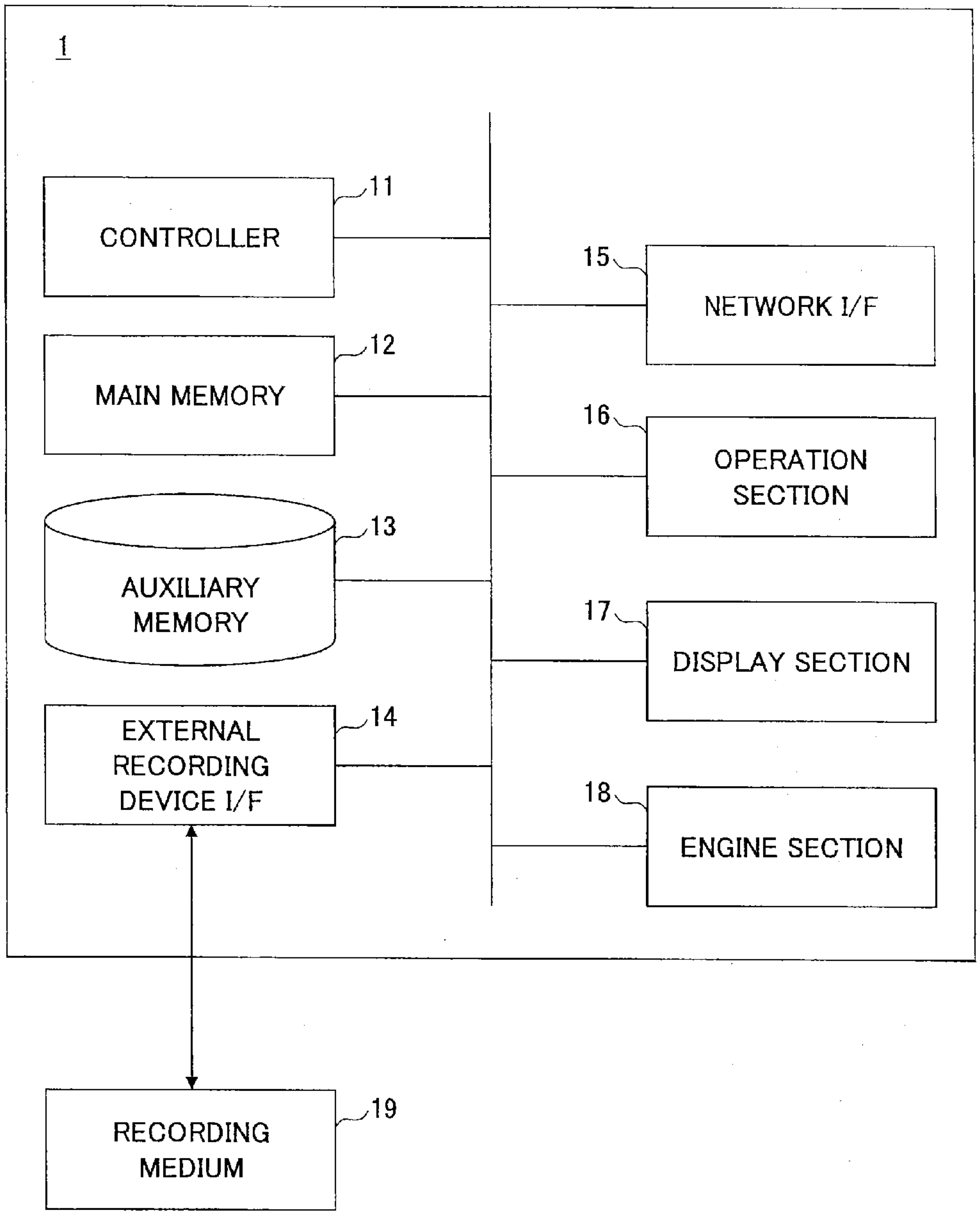
FIG. 2 is a block diagram of an example hardware configuration of the a Multi-Function Peripheral (MFP) according to an embodiment.

FIG. 2 is a block diagram of an example hardware configuration of the MFP 1 according to this embodiment. As illustrated in FIG. 2, the MFP 1 includes a controller 11, a main memory 12, an auxiliary memory (storage) 13, an external recording device interface (I/F) 14, a network I/F 15, an operation section 16, a display section 17, and an engine section 18. These elements are connected to each other via a bus so as to mutually transmit and receive data.

The controller 11 is a Central Processing Unit (CPU) that controls the devices, and calculates and processes various data in the computer. Further, the controller 11 is a processor that executes a program stored (loaded) in the main memory 12 or the auxiliary memory 13, so that, for example, the controller 11 receives data from an input device or the storage, calculates or processes the received data, and outputs the calculated processed data to an output device or the storage.

The main memory 12 is a storage device such as a Read Only Memory (ROM), a Random Access Memory (RAM) or the like, storing or temporarily storing an Operating System (OS) and application software to be executed by the controller 11.

The auxiliary memory 13 is a storage device such as a Hard Disk Drive (HDD) storing data relevant to the application software.

The external recording device I/F 14 is an interface between a recording medium 19 (e.g., a flash memory, an SD card and the like) connected via a data transmission path such as a Universal Serial Bus (USB) and the MFP 1.

The recording medium 19 stores a predetermined program. The predetermined program stored in the recording medium 19 is installed into the MFP 1 via the external recording device I/F 14. The installed predetermined program is executable by the MFP 1.

The network I/F 15 is an interface between a peripheral device having a communication function and the MFP 1, which are connected via a network such as a Local Area Network (LAN) or a Wide Area Network (WAN) including data transmission paths such as wired lines and/or wireless lines.

The operation section 16 and the display section 17 include key switches (hard keys) and a Liquid Crystal Display (LCD) having a touch panel function (including software keys in a Graphical User Interface (GUI)), and are a display and/or an input device serving as a User Interface (UI) when functions of the MFP 1 are used.

The engine section 18 serves as an input/output unit of image data to print the image data of a sheet draft on a transfer sheet. The engine section 18 may further include a scanner engine.

Configuration

Figure 3:
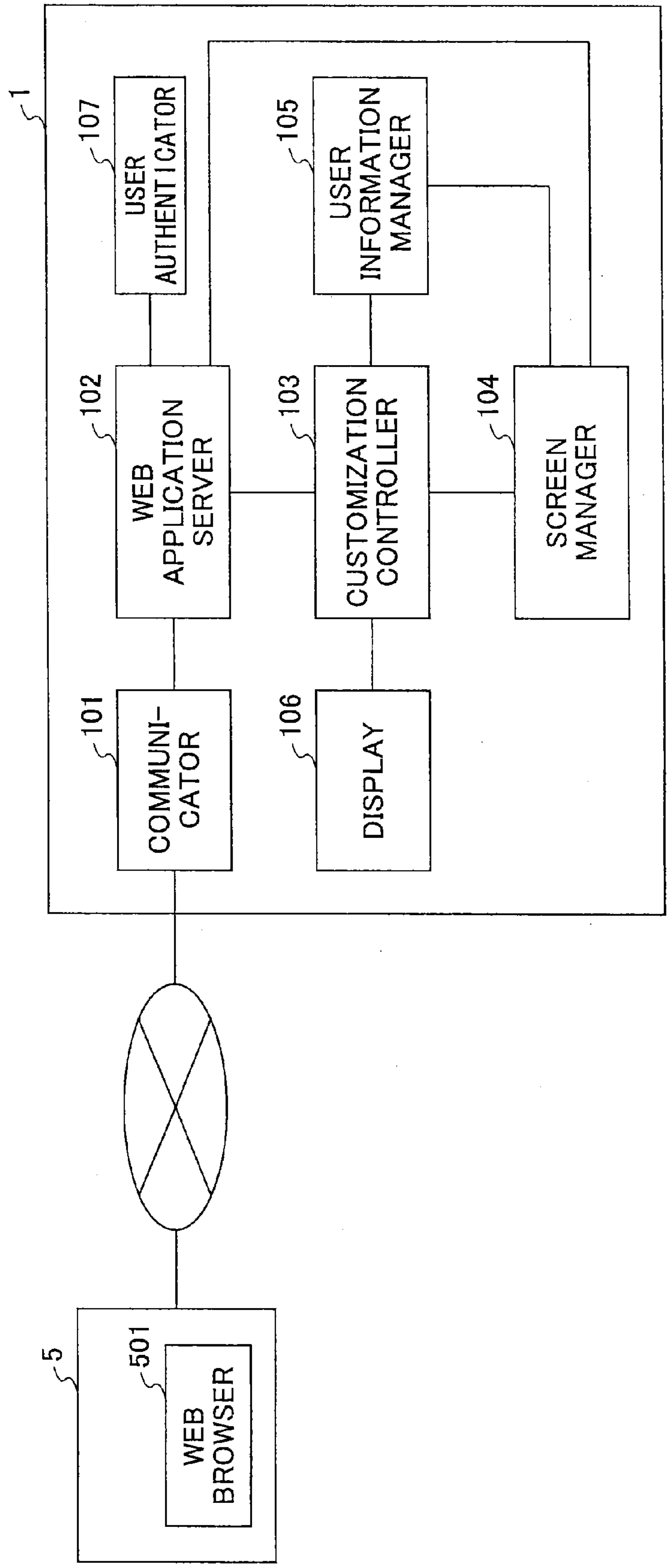
FIG. 3 is a block diagram of an example schematic configuration of the customization control system according to an embodiment.

Next, an example configuration of the customization control system 10 is described. FIG. 3 is a block diagram of an example schematic configuration of the customization control system 10 according to the embodiment. First, a schematic configuration of the client PC 5 is described.

The client PC 5 includes a Web browser 501. The Web browser 501 displays a HyperText Markup Language (HTML) Web screen acquired from the MFP 1. A user may customize a UI screen of the MFP 1 using (via) the Web screen.

In this case, the Web browser 501 customizes the UI screen on the client PC 5 side by using a script (e.g., Javascript) for operating a screen included in the HTML, that is, using Dynamic HTML. When the customization is confirmed, the customization information (edition information) indicating the information of the customized UI screen is transmitted to the MFP 1.

Next, a schematic configuration of the MFP 1 is described. The MFP 1 includes a communicator 101, a Web application server (Web Application controller) 102, a customization controller 103, a user information manager 105, a screen manager 104, a display 106, a user authenticator 107.

The communicator 101 performs, for example, Hypertext Transfer Protocol (HTTP) communications to transmit and/or receive data to and/or from the client PC 5. For example, the communicator 101 receives a request for displaying a UI screen and a request for setting customization information from the client PC 5, and transmits responses to the requests to the client PC 5.

The Web application server 102 generates Web screen information corresponding to the UI screen (e.g., a customization screen) to be displayed. The customization screen herein refers to a Web screen where the UI screen is customized. The Web screen information is in a HTML format, and includes screen information of the UI screen and the script for operating the screen. Further, the Web screen information may further include list information of UI parts which may be displayed on the UI screen.

Further, upon receiving a display request of the UI screen from the communicator 101, the Web application server 102 acquires the screen information of the UI screen from the customization controller 103, the UI screen corresponding to the user sending the display request. The screen information includes the UI part information of the UI parts included in the screen and layout information of the UI parts.

Further, upon receiving the display request of the UI screen from the communicator 101, the Web application server 102 acquires UI part information from the screen manager 104, the UI part information indicating the UI parts which may be displayed on the UI screen.

The Web application server 102 converts the screen information displayed in a programming language format (e.g., a structure and an array of C language) into the screen information in the HTML format, and generates the Web screen information including the script for operating the screen. Further, the Web application server 102 generates a part list screen in the HTML format based on the acquired UI part information. The generated Web screen information and the part list screen information are transmitted to the client PC 5 via the communicator 101. In this case, the part list screen information may be included in the Web screen information.

The Web application server 102 outputs the customization information indicating the customized UI screen to the customization controller 103. Further, when there is an export request of the customization information, the Web application server 102 converts the format of the customization information into an appropriate format such as, for example, a csv format.

When necessary, the Web application server 102 outputs log-in information acquired from the communicator 101 to the user authenticator 107, and sends a request for user authentication. The log-in information includes the user-ID and the password.

The customization controller 103 generates screen configuration information of the customized screen by combining the UI parts customized based on the customization information. The customization controller 103 sets the generated screen configuration information in the user information manager 105.

When receiving an acquisition request along with the user information from the Web application server 102, the acquisition request requesting for acquiring the screen information of the UI screen, the user information corresponding to the user sending the display request, the customization controller 103 acquires the screen configuration information from the user information manager 105, the screen configuration information corresponding to the user sending the display request.

The customization controller 103 acquires detailed information of the UI parts from the screen manager 104 based on the acquired screen configuration information, and generates the screen information of the UI screen. The generated screen information is output to the Web application server 102.

The screen manager 104 manages the UI parts that may be displayed on the UI screen. For example, the screen manager 104 manages UI part information in which an icon image, an application name, and an attribute are associated with each of the UI parts. The screen manager 104 manages the validity/invalidity of the UI parts based on the validity/invalidity of the functions.

The user information manager 105 manages the screen configuration information of the customized UI screen for each of the registered users. For example, the screen configuration information includes the information of the UI parts to be displayed on a default home screen, and the layout (placement) information of the UI parts.

Further, for example, the user information manager 105 manages authority information associated with the functions and indicating user's usage authority, that is, for example, which of the users have the authority to use which of the functions.

The display 106 displays the UI screen customized by a user. For example, the customized home screen and the like are displayed using the client PC 5.

The user authenticator 107 authenticates a user based on the acquired log-in information and outputs the authentication result to the Web application server 102.

The communicator 101 may be realized by, for example, the network I/F 15. The display 106 may be realized by, for example, an operation panel such as the operation section 16 and the display section 17. The Web application server 102, the customization controller 103, and the user authenticator 107 may be realized by, for example, the controller 11, the main memory 12 as the working memory and the like. The screen manager 104 and the user information manager 105 may be realized by, for example, the auxiliary memory 13.

Web Screen Information

Next, an example Web screen information to be transmitted from the MFP 1 to the client PC 5 is described. The Web screen information includes the script for operating the screen. In the example described below, to realize moving the icon, by using Javascript (Registered Trademark), the mounting operation on the Web browser is realized.

FIGS. 4A and 4B illustrate an example of the Web screen information. In the example of FIGS. 4A and 4B, the jquary is used for the Javascript which is a sample of the icon movement. The jquary is a one kind of Javascript library.

The part indicated by using the reference numeral "41" (hereinafter the "part 41") of FIG. 4A, the jquary which is a Javascript Library is used. In the part 41, the position of the source is designated, and the jquary is acquired by the Web browser.

The part 42 of FIG. 4A indicates, for example, the HTML indicating an icon list of the UI screen. The UI screen includes a copy icon, a document box icon, and an e-mail icon.

The part 43 of FIG. 4B is written with the Javascript and directly described in HTML. However, the jquary script is in another file. This script indicates the icon movement.

The part 43 describes as follows:

the object having a class name "icon" is set to be draggable;

the draggable area is within the area having the id name "area";

the td tag in the tags in the area having the id name "area" is set to be droppable;

the object having a class name "icon" is set to be droppable;

the icon originally disposed in the dropped destination is moved to the cell where the dropped icon previously existed; and the dropped icon is moved to the cell of the dropped destination, and the position of the cell is reset.

As described above, the script for operating the screen is included in the HTML of the Web screen information. Therefore, the UI screen may be customized on the client PC 5 side. After the customization is confirmed, the customization information may be transmitted to the MFP 1.

Further, the script for adding and deleting the icon may be included in the HTML of the Web screen information. Namely, the script included in the Web screen information may dynamically change the display content of the HTML. When an icon is to be added, a list screen of the icons is displayed, so that the icon to be added is selected from the list screen.

UI Screen Example

Figure 5:
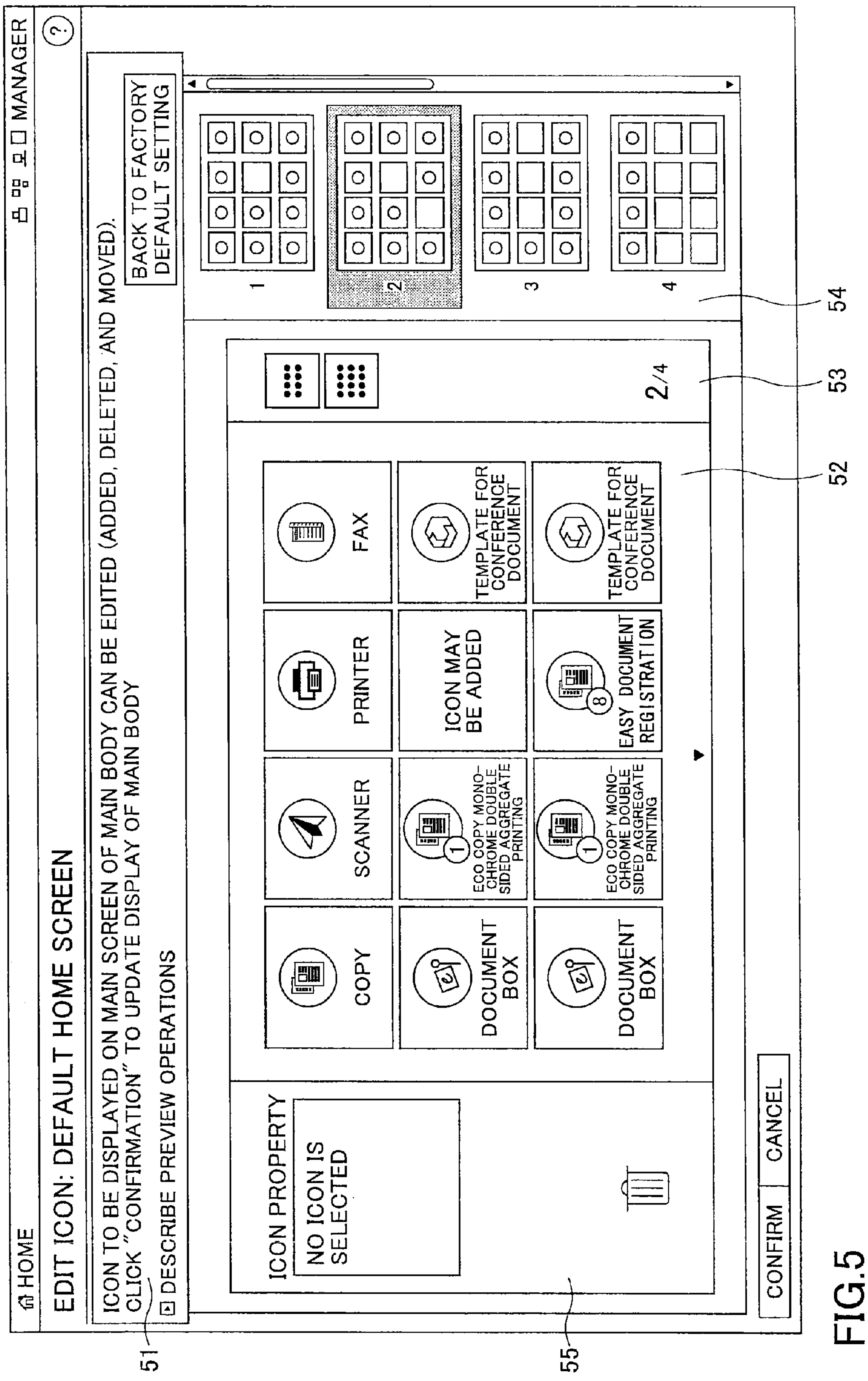
FIG. 5 is an example of a customization screen to customize a home screen.

Next, an example of the UI screen displayed on the client PC 5 side is described. FIG. 5 is a first example customization screen to customize the home screen. The customization screen of FIG. 5 includes an icon edition header area 51, a home screen display area 52, a home screen information area 53, an outline display area 54, and a property area 55. The customization screen is an example of UI parts.

The icon edition header area 51 displays edition contents and operation contents of the icon. The home screen display area 52 displays the home screen of the MFP 1. A user may customize the home screen.

The home screen information area 53 displays an example of the column where the icons are arranged. The outline display area 54 displays arrangement examples of icons. The property area 55 displays the properties of the selected icon.

The screen as illustrated in FIG. 5 is displayed by the client PC 5 based on the Web screen information.

Figure 6:
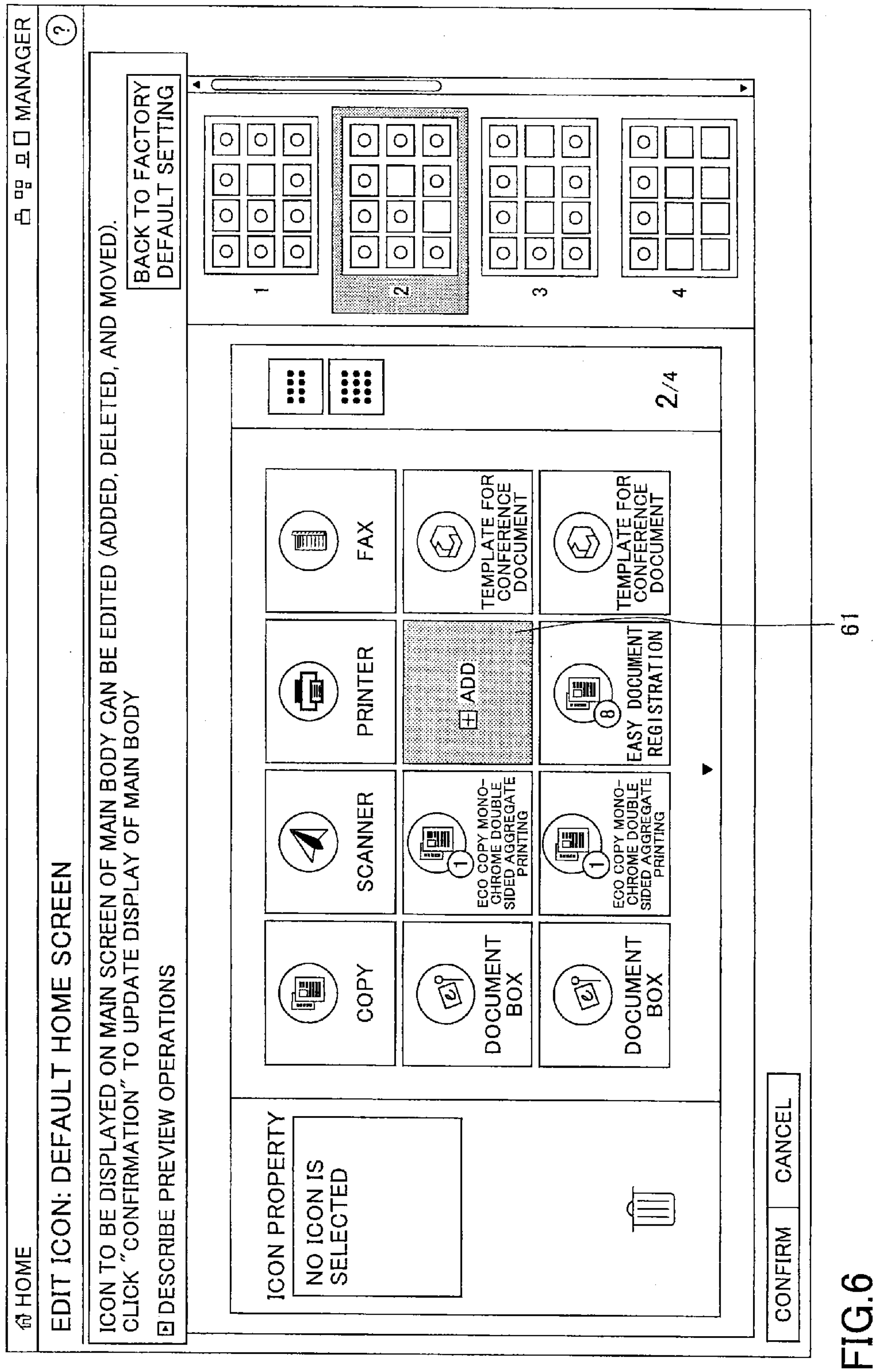
FIG. 6 is another example of the customization screen to customize the home screen.

FIG. 6 is a second example customization screen to customize the home screen. The customization screen of FIG. 6 indicates an example where a button 61 of the customization screen is pressed (clicked). When the button 61 is pressed (clicked), the UI part list screen as illustrated in FIG. 7 is displayed.

FIG. 7 illustrates an example of the UI part list screen. The icon is an example of the UI parts. When a radio button of the UI part list of FIG. 7 is selected, the selected UI part is added to the button 61. The radio button 71 has half-brightness, which means that the corresponding UI part is invalid. Similarly, other buttons having the half-brightness are also invalid and cannot be selected. The UI parts of the radio buttons that can be selected are valid UI parts.

Outline of Customization

Next, the outline of the customization is described. FIG. 8 illustrates an example of the screen configuration information of the home screen. The home screen is an example of the UI screen. The "screen position" in FIG. 8 refers to where the part (icon) is displayed in the screen. The "part ID" refers to the ID to identify the icons. The "part name" is the name of the part. The "part type" refers to a type of the UI part and indicates whether the part is a basic (fundamental) application, a macro (which is also called a program) of an application or the like.

In the example of FIG. 8, no UI part is arranged in the screen position. Further, in FIG. 8, for explanatory purposes, the screen configuration information is described using a table format. However, the screen configuration information is described in the HTML format when transmitted from the MFP 1 to the client PC 5.

FIG. 9 illustrates an example of the UI part information. As illustrated in FIG. 9, the UI part information stores (includes) a list of the UI parts. The UI part information is described in the HTML format when transmitted from the MFP 1 to the client PC 5.

Here, it is assumed that, on the Web browser 501 of the client PC 5, a user assigns (substitutes) the "ECO Binding" of "P5" in FIG. 8 to the screen position 8 to replace the item currently assigned. The assignment (substitution) process and the replacement process are executed by the client PC 5 side.

Next, after the assignment process and the replacement process are finished, when a confirmation button of the customization is pressed (clicked), the Web browser 501 transmits the customization information (the edition information) indicating the customized home screen to the MFP 1.

FIG. 10 illustrates an example of the customization information. As illustrated in FIG. 10, the customization information may include at least the screen position and the corresponding part ID. When the content of the customization indicates the addition, the deletion, or the change of the UI part, the customization information may include only the screen position and the corresponding part ID.

In the example of FIG. 10, the part ID "P5" is assigned to the screen position 7 and the items in the screen positions 2 and 8 are replaced by each other. The customization information as illustrated in FIG. 10 is transmitted from the client PC 5 to the MFP 1.

Upon the reception of the customization information from the client PC 5, the MFP 1 configures (generates) the home screen using the UI part(s) of the UI part information based on the received customization information, and sets the configuration information of the home screen in the user information manager 105. In this case, the MFP 1 sets the screen configuration information by associating the screen configuration information with the user who performed (is relevant to) the customization.

Operations

Next, the operations of the customization control system 10 according to an embodiment are described.

Display Operation

Figure 11:
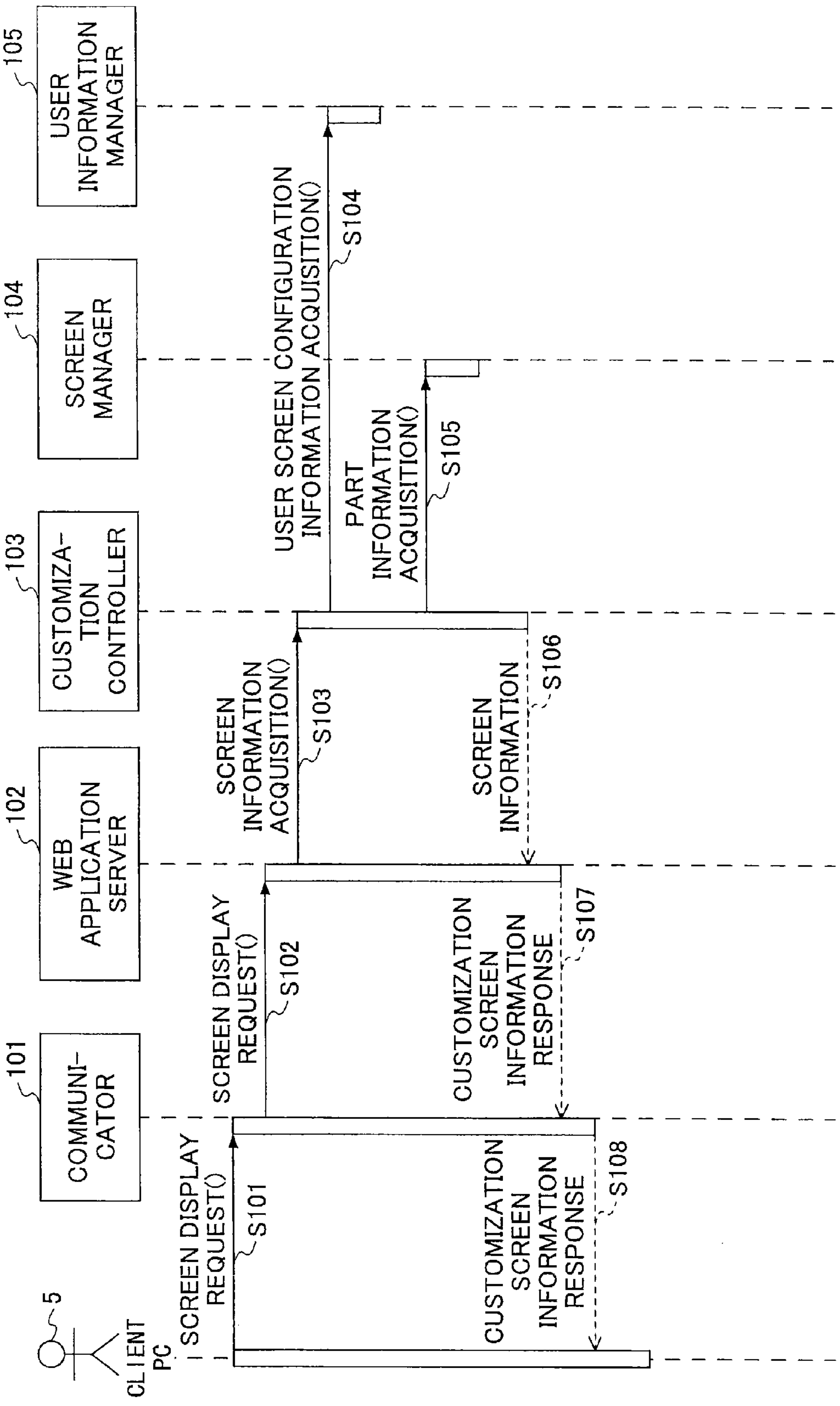
FIG. 11 is a sequence diagram of an example of a display process of the customization screen.

FIG. 11 is a sequence diagram illustrating an example display process of displaying the customization screen. As illustrated in FIG. 11, in step S101, the client PC 5 transmits a screen display request of the customization screen to the MFP 1. In this case, the screen display request includes user information of the user requesting the screen display.

In step S102, the communicator 101 receives the screen display request, and outputs the screen display request to the Web application server 102.

In step S103, upon the acquisition of the screen display request, the Web application server 102 sends a request to the customization controller 103 to acquire the screen information of the home screen corresponding to the user requesting the screen display.

In step S104, the customization controller 103 acquires the screen configuration information corresponding to the user requesting the screen display from the user information manager 105.

In step S105, the customization controller 103 acquires detailed information of the UI part(s) included in the screen configuration information from the screen manager 104. In this case, the customization controller 103 may acquire a list of the valid (i.e., effective or usable) UI parts from the screen manager 104.

In step S106, the customization controller 103 outputs the screen information of the generated home screen to the Web application server 102.

In step S107, the Web application server 102 generates the customization screen information (Web screen information) in the HTML format of the customization screen which is a Web screen based on the acquired home screen information, the UI part information, and the script for operating the screen (see FIGS. 4A and 4B). The generated customization screen information is output to the communicator 101 as a response.

The Web application server 102 may acquire the UI part information directly from the screen manager 104.

In step S108, the communicator 101 transmits the customization information to the client PC 5 as, for example, a http response.

By doing this, the Web screen to customize the UI screen of the MFP 1 is displayed by using the Web browser 501 of the client PC 5.

Setting Process

Next, on the Web browser 501, a process of customizing the UI screen of the MFP 1 and setting the customized customization information in the MFP 1 is described. The customization information indicates the customized UI screen.

Figure 12:
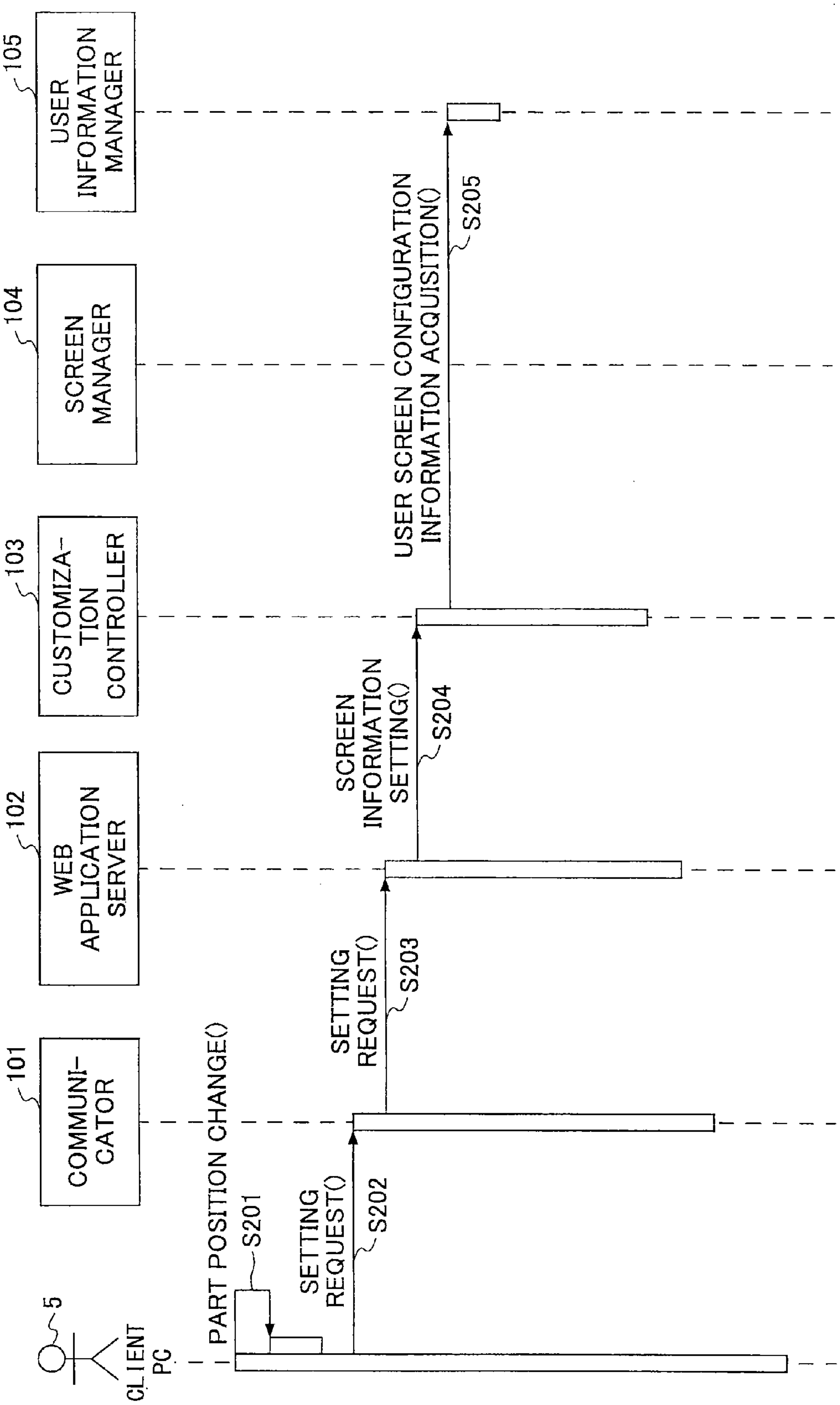
FIG. 12 is a sequence diagram of an example of a setting process of the customization information.

FIG. 12 is a sequence diagram indicating an example of a setting process of setting the customization information. As illustrated in FIG. 12, in step S201, for example, the client PC 5 changes the layout (position) of the part of the UI screen (e.g., the home screen) of the MFP 1 by using the Web screen.

In step S202, upon detecting that the confirmation button of the customization is pressed, the client PC 5 transmits a setting request to the MFP 1, the setting request including the customization information and the user information of the user who made the customization.

In step S203, upon receiving the setting request, the communicator 101 outputs the setting request to the Web application server 102.

In step S204, the Web application server 102 sends a request to the customization controller 103 to set the screen information based on the information included in the setting request.

In step S205, the customization controller 103 generates the screen configuration information of the UI screen based on the customization information. The customization controller 103 sets the generated screen configuration information in the screen configuration information that is managed by the user information manager 105 and that corresponds to the user sending the setting request.

By doing this, the MFP 1 may store the screen configuration information of the UI screen after the customization is confirmed by the client PC 5. After the completion of the setting, the MFP 1 may display the customized UI screen on the display 106.

Confirmation Process

Next, a process of confirming whether the customized UI part is usable (valid) is described. When a user customizes the UI part, due to, for example, the change of the setting on the MFP 1 side and the installation state of the functions, the customized contents may not be set in the UI screen.

Figure 13:
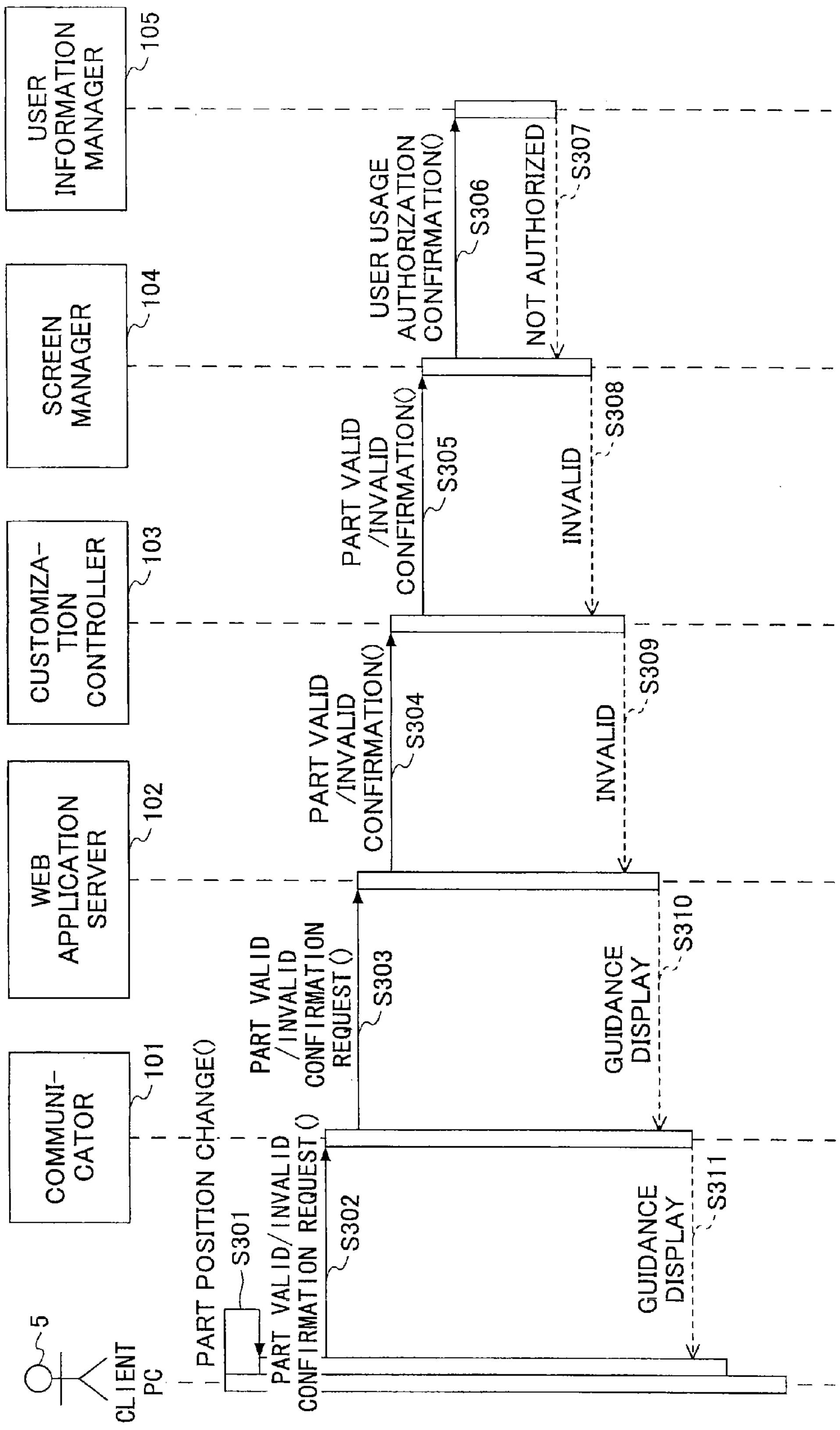
FIG. 13 is a sequence diagram of an example of a confirmation process whether the UI part is usable.

FIG. 13 is a sequence diagram illustrating an example of the confirmation process of confirming whether the UI part is usable (valid). As illustrated in FIG. 13, in step S301, on the Web browser 501 of the client PC 5, the customization of the UI part is executed. Here, it is assumed that a new UI part is arranged on the UI screen of the MFP 1.

In step S302, when the confirmation button is pressed, the Web browser 501 transmits a confirmation request to confirm whether the customized UI part (e.g., a new UI part) is valid (usable) or not (invalid) using the script in the Web screen to the MFP 1.

In step S303, upon the reception of the confirmation request, the communicator 101 outputs the confirmation request to the Web application server 102.

In step S304, upon acquiring the confirmation request, the Web application server 102 sends a request to the customization controller 103 to confirm whether the UI part is valid (usable) or not (invalid).

In step S305, the customization controller 103 sends a request to the screen manager 104 to confirm whether the customized UI part is valid (usable) or not (invalid).

In step S306, the screen manager 104 specifies the function of the customized UI part, and sends a request to the user information manager 105 to confirm whether the user relevant to the customization is authorized to use the function.

In step S307, the user information manager 105 determines whether the user relevant to the customization is authorized to use the function of the customized UI part based on authorization information in which the function is associated with the user who is authorized to use the function. The user information manager 105 transmits the determination result to the screen manager 104.

FIG. 14 is a table illustrating an example of the authorization information. As illustrated in FIG. 14, for each of the functions (applications), the authorization information includes the information of which of the users are authorized to use the function (application). When the authorization information of FIG. 14 is used, when, for example, the user A customizes (to add) the UI part of the copy function, the use of the copy function by the user A is allowed. When, however, the user A tries to customize (to add) the UI part of the scanner function, the use of the scanner function by the user A is not allowed. In the example of FIG. 14, it is assumed that the use of the function by the user is not allowed.

Referring back to FIG. 13, in step S308, the screen manager 104 acquires the confirmation (determination) result, and reports that the customized UI part is invalid (unusable) to the customization controller 103.

In step S309, the customization controller 103 reports that the customized UI part is invalid (unusable) to the Web application server 102.

In step S310, when determining that the customized UI part is invalid, the Web application server 102 outputs a display request to display alarm guidance as a response.

In step S311, the communicator 101 transmits the display request to display alarm guidance to the Web browser 501 as a response.

By doing this, upon receiving the display request to display alarm guidance, the Web browser 501 reports (displays) "the UI part currently customized cannot be set in the MFP 1" to the user.

Exporting Process

Figure 15:
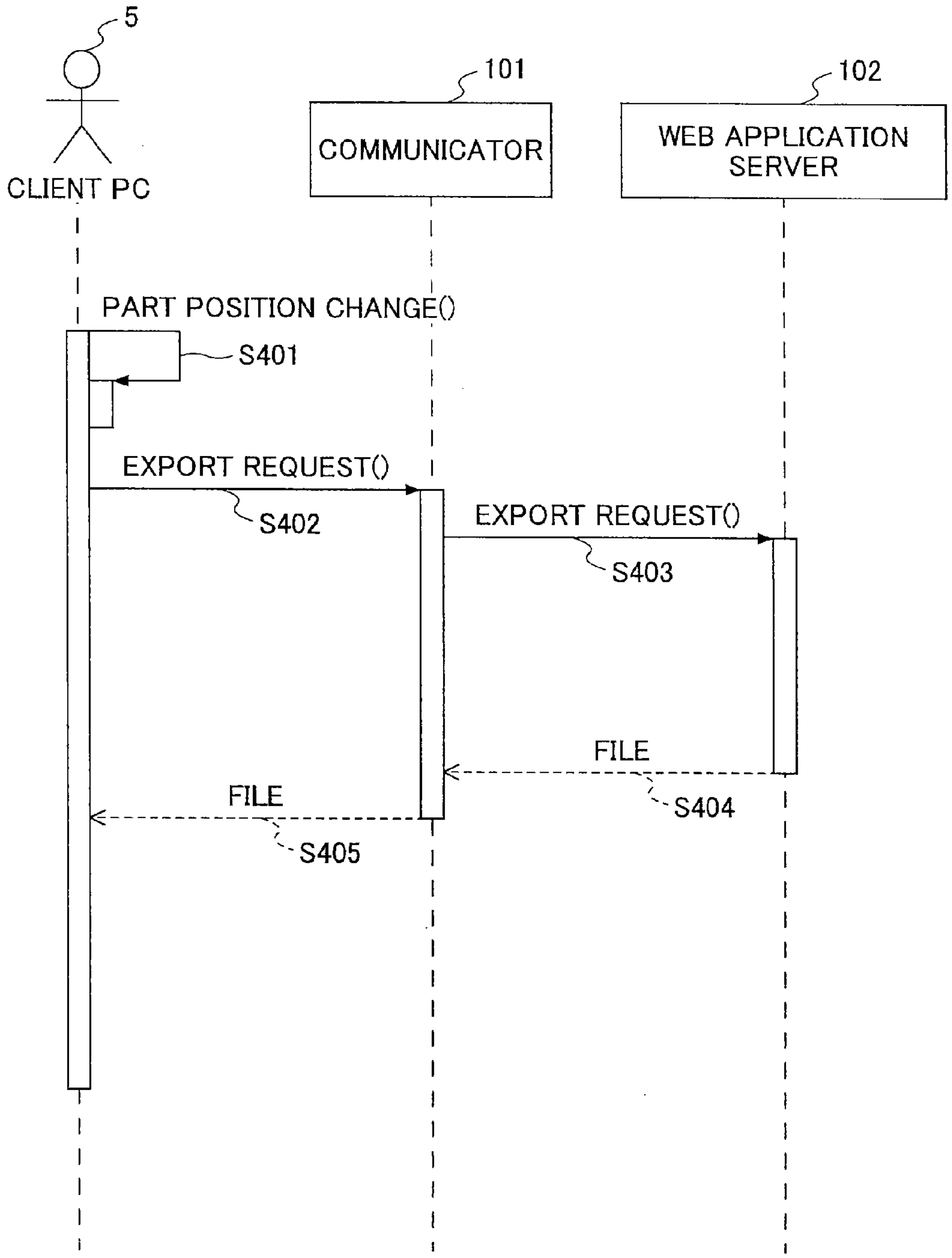
FIG. 15 is a sequence diagram of an example of an export process.

Next, a process of exporting the UI screen in the middle of editing (customization) and the edited (customized) UI screen is described. FIG. 15 is a sequence diagram illustrating an example of the exporting process. As illustrated in FIG. 15, in step S401, on the Web browser 501 of the client PC 5, the customization of the UI part is executed. Here, during the process of the customization, it is assumed that the user has to do other tasks. In such a case, the user may instruct the client PC 5 to export the customization information.

In step S402, the client PC 5 sends an export request to export the result of the UI screen customized on the Web browser 501 to the MFP 1. In this case, the export request includes the customization information.

In step S403, upon receiving the export request, the communicator 101 outputs the export request to the Web application server 102.

In step S404, the Web application server 102 converts the format of the information equivalent to the screen information based on the acquired customization information into a file format such as the csv file format. The converted file is output to the communicator 101.

In step S405, the communicator 101 transmits the generated (converted) file to the client PC 5.

By doing this, the client PC 5 may execute the export process when, for example, the user needs to temporarily store the UI screen in the middle of editing (customization).

Setting Process of Export File

Figure 16:
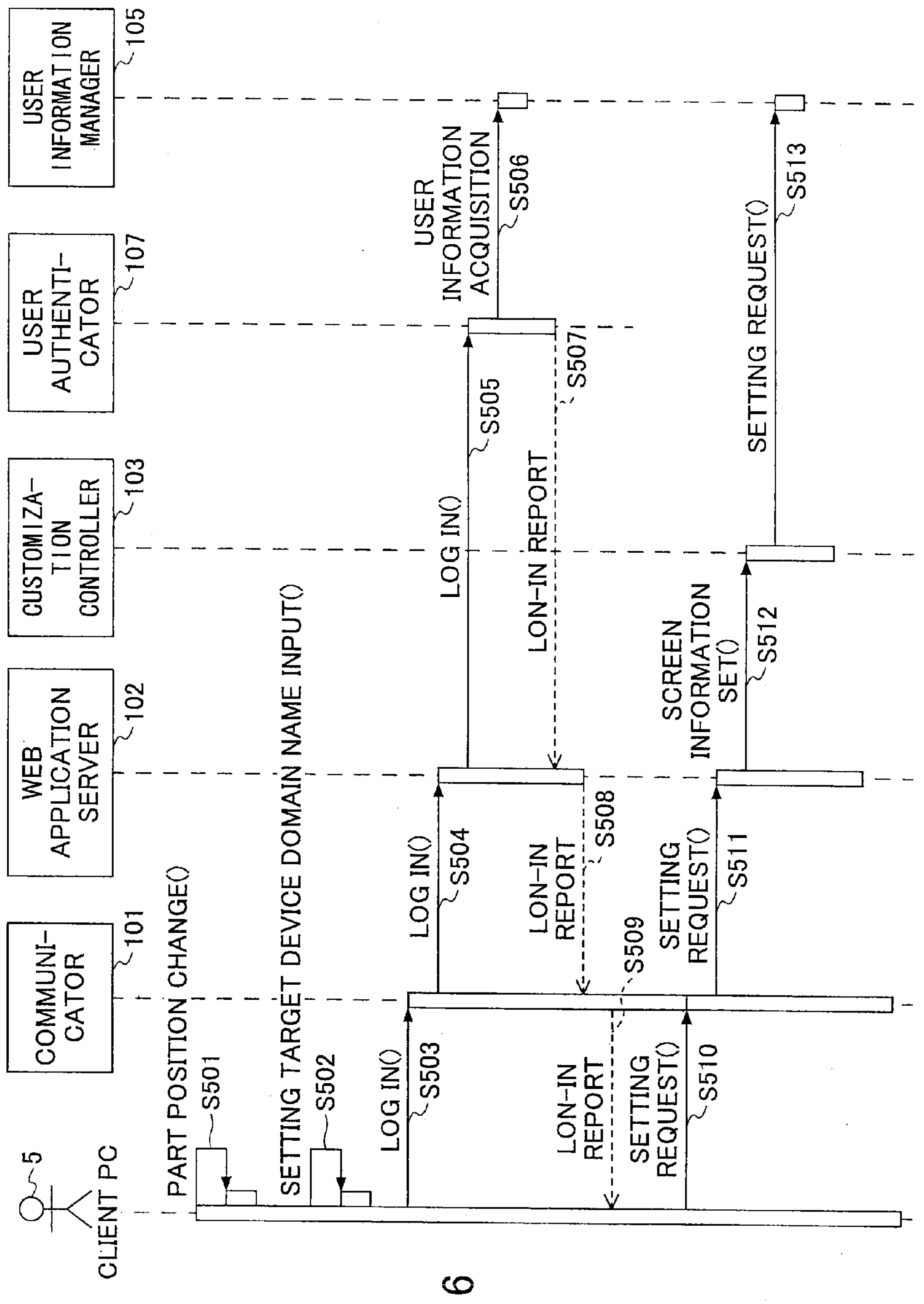
FIG. 16 is a sequence diagram of an example of a setting process of an export file.

Next, a process of setting the same MFP or another MFP using an export file is described. FIG. 16 is a sequence diagram illustrating a setting process of the export file.

As illustrated in FIG. 16, in step S501, on the Web browser 501 of the client PC 5, the customization of the UI part is executed. In this case, the export file is to be installed.

In step S502, the identification information (e.g., the domain name or the IP address) of the target device where the export file is to be set is input to the client PC 5.

In step S503, the client PC 5 generates http requests (a log-in request and a setting request) to the setting target device.

In step S504, upon receiving the log-in request, the communicator 101 sends a request to the Web application server 102 to log-in.

In step S505, the Web application server 102 requests the user authenticator 107 to perform the log-in process.

In step S506, the user authenticator 107 acquires user information necessary for the log-in from the user information manager 105, and performs the log-in process. Here, it is assumed that the log-in is successful.

In step S507, the user authenticator 107 reports the log-in result to the Web application server 102.

In step S508, the Web application server 102 reports the log-in result to the communicator 101.

In step S509, the communicator 101 reports the log-in result to the client PC 5.

In step S510, the client PC 5 transmits the setting request of setting the export file to the MFP 1. In this case, when plural domain names are designated, the setting request is transmitted to the MFPs corresponding to the domain names. The setting request includes the export file.

In step S511, upon receiving the setting request, the communicator 101 outputs the setting request to the Web application server 102.

In step S512, the Web application server 102 outputs the export file included in the setting request, and requests the customization controller 103 to set the screen information.

In step S513, the customization controller 103 generates the screen configuration information of the UI screen based on the export file. The customization controller 103 sets the screen configuration information that is managed by the user information manager 105 and that corresponds to the user relevant to the setting request.

By doing this, the MFP 1 may set the export file stored in the client PC 5 in the device (itself).

Further, by transmitting the setting request to the Uniform Resource Locator (URL) for setting other device(s), it may become possible to set the customization information in the other device(s).

Figure 17:
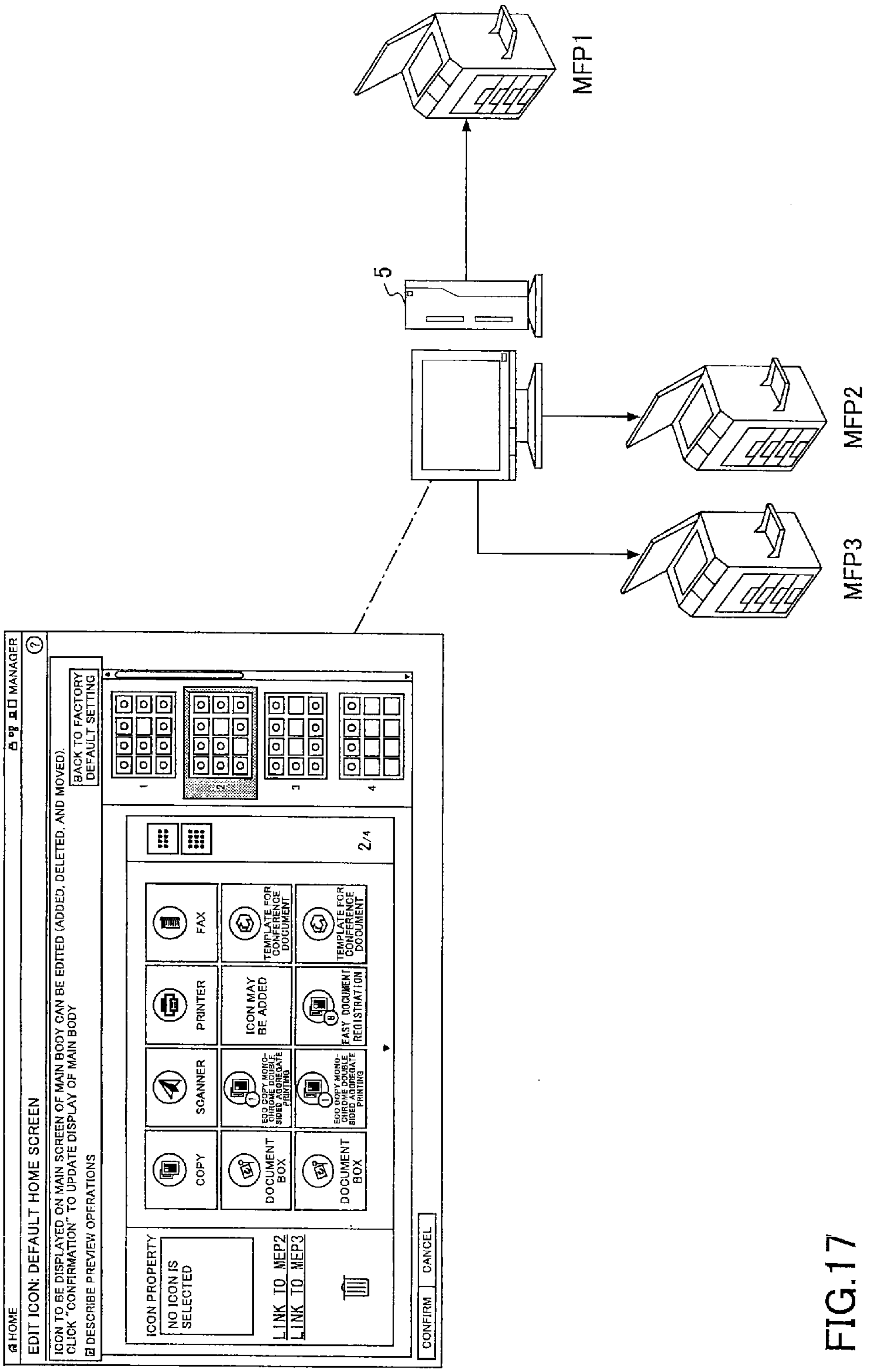
FIG. 17 is an example conceptual diagram to set other apparatuses.

FIG. 17 is a conceptual drawing illustrating a case of setting other devices. In the example in FIG. 17, it is assumed that the domain name (IP address) or the URL of the MFP 2 and the MFP 3 are registered in the MFP 1. Further, when the MFP 1 transmits the Web screen information to the client PC 5, the Web screen information includes the link information to the MFP 2 and the MFP 3.

The client PC 5 displays the Web screen to be customized from (based on) the Web screen information. The Web screen is linked to the MFR 2 and the MFP 3.

After the customization of the UI screen, when the link is pressed (clicked), the Web browser 501 of the client PC 5 transmits the customization information along with the setting request to the linked MFPs.

By doing this, it may become possible to transmit the same setting request including the customization information to one or more other devices.

As described above, according to an embodiment, it may become possible to edit the UI screen on the PC side without increasing the traffic of the transmission path. Further, according to an embodiment, it may become possible to execute the customization process in a shorter time period. This is because it may no longer be necessary to communicate with the MFP whenever the customization step is performed.

Modification Example

A program to be executed by an image processing apparatus according to an embodiment may be recorded in a non-transitory computer-readable recording medium in an installable and executable format, the recording medium including, but not limited to, a CD-ROM, a flexible disk (FD), a CD-R, and a Digital Versatile Disk (DVD).

Further, the program to be executed by the image processing apparatus according to an embodiment may be stored in a computer connected via a network such as the Internet, so that the program may be provided by downloading from the computer via the network. Further, the program to be executed by the image processing apparatus according to an embodiment may be provided or distributed via a network such as the Internet.

Further, the program to be executed by the image processing apparatus according to an embodiment may be stored into a Read Only Memory (ROM) or the like in advance, so that the program included in the ROM may be provided.

The program to be executed by the image processing apparatus according to an embodiment may have a module configuration including the means (units, sections) described above. In the practical hardware, the controller (processor) 11 reads the program from the auxiliary memory 13 and executes the program. By doing this, one or plural means among the means described above are loaded into the main memory 12 so that the one or plural means among the means may be generated in the main memory 12.

According to an embodiment, there is provided an edition control system including an image processing apparatus and an information processing apparatus which are connected to each other via a network. The edition control system includes a screen manager managing UI (User Interface) part information indicating a UI part displayable on a UI screen; a user information manager managing screen configuration information of the UI screen for each user; an edition controller generating screen information of the UI screen based on the UI part information managed by the screen manager and the screen configuration information that is managed by the user information manager and that corresponds to a user relevant to the display request, the UI screen being requested to be displayed when receiving a display request to display the UI screen from the information processing apparatus; a Web application controller converting the generated screen information into an HTML format, and generating Web screen information of a Web screen where the UI screen is edited and that includes the screen information in the HTML format and a script for screen operation; a communicator transmitting the generated Web screen information to the information processing apparatus; and a Web browser displaying the Web screen based on the Web screen information, and transmitting edition information indicating the UI screen where editing has been confirmed using the script to the Web application controller. Further, upon acquiring the edition information from the Web application controller, the edition controller sets the screen configuration information of the UI screen based on the edition information in the user information manager.

According to an embodiment, there is provided an image processing apparatus controlling customization of a UI screen. The image processing apparatus includes a screen manager managing UI part information indicating a UI part displayable on a UI screen; a user information manager managing screen configuration information of the UI screen for each of users; an edition controller generating screen information of the UI screen based on the UI part information managed by the screen manager and the screen configuration information that is managed by the user information manager and that corresponds to a user relevant to the display request, the UI screen being requested to be displayed when receiving a display request to display the UI screen from an information processing apparatus connected to the image processing apparatus via a network; a Web application controller converting the generated screen information into an HTML format and generating Web screen information of a Web screen where the UI screen is edited and that includes the screen information in the HTML format and a script for screen operation; and a communicator transmitting the generated Web screen information to the information processing apparatus, and receiving edition information indicating the UI screen where editing is confirmed by the script from the information processing apparatus. Further, the edition controller sets the screen configuration information of the UI screen based on the edition information in the user information manager.

According to an embodiment, there is provided a computer-readable program that instructs a microcomputer to perform the following steps: generating, when receiving a display request of a UI screen from an information processing apparatus, screen information of the UI screen based on UI part information and screen configuration information, the UI part information being managed by a screen manager managing UI part information indicating a UI part displayable on the UI screen, the screen configuration information being managed by a user information manager managing the screen configuration information of the UI screen for each of users and corresponding to a user relevant to the display request, the UI screen being requested to be displayed; converting the generated screen information into an HTML format and generating a Web screen information of a Web screen where the UI screen is edited and that includes the screen information in the HTML format and a script for screen operation; transmitting the generated Web screen information to the information processing apparatus; receiving edition information indicating the UI screen where editing is confirmed by the script from the information processing apparatus; and setting the screen configuration information of the UI screen based on the edition information in the user information manager.

According to an embodiment, the program according to an embodiment may be recorded in a non-transitory computer-readable recording medium, so that the recording medium causes a computer to read and execute the program.

According to an embodiment, it may become possible to edit (customize) the UI screen on the PC side without increasing the traffic of the transmission path.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An edition control system comprising:

an image processing apparatus; and an information processing apparatus connected to the image processing apparatus via a network, wherein the image processing apparatus includes a User Interface (UI) part information storage unit configured to store UI part information indicating a UI part that can be displayed in a UI screen, a screen configuration information storage unit configured to store screen configuration information of the UI screen, a screen information generation unit configured to generate screen information related to the UI screen based on the UI part information stored in the UI part information storage unit and the screen configuration information stored in the screen configuration information storage unit, a screen information transmission unit configured to transmit the screen information generated by the screen information generation unit and a program for an edit operation related to the UI screen in the screen information to the information processing apparatus, an edit information receiving unit configured to receive, from the information processing apparatus, edit information related to the UI screen corresponding to edition related to the UI screen performed by the information processing apparatus, and a confirmation request of the UI screen, a screen managing unit configured to confirm whether the UI screen is valid or invalid based on the edit information received by the edit information receiving unit, a screen configuration information update unit configured to update the screen configuration information of the UI screen, which is stored in the screen configuration information storage unit, based on the edit information received by the edit information receiving unit, when the UI screen is confirmed as being valid by the screen managing unit, and a reporting unit configured to report that the UI screen is invalid to the information processing apparatus, when the UI screen is confirmed as being invalid by the screen managing unit, and the information processing apparatus includes a UI screen display control unit configured to display the UI screen in the screen information transmitted from the image processing apparatus, and receive edition related to the displayed UI screen based on the program transmitted from the image processing apparatus, an edit information transmission unit configured to transmit the edit information related to the UI screen corresponding to the edition received by the UI screen display control unit, and the confirmation request of the UI screen, to the image processing apparatus, and an output unit configured to output that the UI screen has been confirmed as being invalid, when a report, which indicates that the image processing apparatus has confirmed that the UI screen is invalid, is received.

2. The edition control system according to claim 1, wherein the program is a script, and the screen information transmission unit is configured to transmit the screen information including the script to the information processing apparatus.

3. An image processing apparatus which is connected to an information processing apparatus via a network, the image processing apparatus comprising:

a User Interface (UI) part information storage device configured to store UI part information indicating a UI part that can be displayed in a UI screen;

a screen configuration information storage device configured to store screen configuration information of the UI screen; and circuitry configured to generate screen information related to the UI screen based on the UI part information stored in the UI part information storage device and the screen configuration information stored in the screen configuration information storage device, transmit the screen information that has been generated and a program for an edit operation related to the UI screen in the screen information to the information processing apparatus, receive, from the information processing apparatus, edit information related to the UI screen corresponding to edition related to the UI screen performed by the information processing apparatus, and a confirmation request of the UI screen, confirm whether the UI screen is valid or invalid based on the edit information that has been received, update the screen configuration information of the UI screen, which is stored in the screen configuration information storage device, based on the edit information that has been received, when the UI screen is confirmed as being valid by the circuitry, and report that the UI screen is invalid to the information processing apparatus, when the UI screen is confirmed as being invalid by the circuitry.

4. The image processing apparatus according to claim 3, wherein the program is a script, and the circuitry is configured to transmit the screen information including the script to the information processing apparatus.

5. A method comprising:

generating, in response to a request of a UI screen from an information processing apparatus, screen information, which is related to a UI part that can be displayed in the UI screen stored in a storage apparatus, and screen information which is related to the UI screen based on screen configuration information of the UI screen;

transmitting the generated screen information and a program for an edit operation related to the UI screen in the screen information;

receiving, from the information processing apparatus, edit information related to the UI screen corresponding to edition related to the UI screen, and a confirmation request of the UI screen;

confirming whether the UI screen is valid or invalid based on the edit information received by the receiving;

updating the screen configuration information of the UI screen stored in the storage apparatus based on the transmitted edit information, when the UI screen is confirmed as being valid by the confirming; and reporting that the UI screen is invalid to the information processing apparatus, when the UI screen is confirmed as being invalid by the confirming.

6. The method according to claim 5, wherein the program is a script, and the screen information transmission step transmits the screen information including the script.

* * * * *